United States Patent [19]

Kokubun et al.

[11] Patent Number: 4,648,313
[45] Date of Patent: Mar. 10, 1987

[54] BEVERAGE BREWING APPARATUS FOR A VENDING MACHINE

[75] Inventors: Yoshikazu Kokubun, Shin; Kunitake Hatori, Maebashi; Takeshi Kanezashi, Kiryu, all of Japan

[73] Assignee: Sanden Corporation, Gunma, Japan

[21] Appl. No.: 737,667

[22] Filed: May 24, 1985

[30] Foreign Application Priority Data

May 28, 1984 [JP] Japan .............................. 59-77018[U]

[51] Int. Cl.⁴ ............................................ A47J 31/00
[52] U.S. Cl. .................................................. 99/289 R
[58] Field of Search ................. 99/289 R, 283, 289 T, 99/279, 297; 426/433

[56] References Cited

U.S. PATENT DOCUMENTS

| | | | |
|---|---|---|---|
| 3,349,690 | 10/1967 | Heier | 99/283 |
| 4,308,789 | 1/1982 | Valente | 99/289 R |
| 4,389,924 | 6/1983 | Hoesselbarth | 99/289 R |

*Primary Examiner*—Robert W. Jenkins
*Attorney, Agent, or Firm*—Banner, Birch, McKie & Beckett

[57] ABSTRACT

A beverage brewing apparatus suitable for use in a vending machine has a frame supporting a vertically movable open-bottom cylinder and a piston slidably disposed within the cylinder. A base assembly is reciprocal horizontally between a brewing position and rest position. Actuation of various components is controlled by a motor through a cam shaft. The downward movement of the piston is controlled by the operation of a cam element, but this operation of the cam applying vertical force to push the piston also applies a horizontal force tending to offset the axial center lines between the piston and cylinder. Therefore means for preventing the piston from lateral horizontal movement relative to the cylinder insures improved sealing between the piston and cylinder.

2 Claims, 8 Drawing Figures

BEVERAGE BREWING APPARATUS FOR A VENDING MACHINE

BACKGROUND OF THE INVENTION

This invention relates to a beverage brewing apparatus suitable for use in a beverage vending machine, and more particularly, to improvement of the sealing situation between the brewing liquid cylinder and piston during the brewing operation of the apparatus.

Beverage brewing apparatus suitable for use in vending machines for preparing single cup quantities of beverages from beverage material is well known in the prior art. For example, U.S. Pat. No. 3,349,690 issued to William Heier discloses one construction for such a brewing apparatus.

Referring to FIG. 1 on the application drawings, the basic construction and brewing cycle of a prior art apparatus will be described. Frame 1 of the apparatus supports a vertically movable open-bottom cylinder 2 which has the bottom opening covered by a filter member 3. A vertically movable piston 4 is disposed within cylinder 2 and relative movement between cylinder 2 and piston 4 is created by operation of a cam member 5 driven by motor 6. One end opening of a duct 7 is connected with a water tank (not shown) through electromagnetic valve 9, this end opening being closely placed above the upper opening of cylinder 2 to supply hot water into cylinder 2. A brewing cavity 10, which is generally reciprocable horizontally between a brewing position (this position being shown by solid lines in FIG. 1) and a rest position (this position being shown by dot and dash lines in FIG. 1), is placed beneath the cylinder 2 and sealed with the lower portion of cylinder 2 in the brewing position.

The prior art apparatus is also provided with a coffee hopper 11 which is connected with a canister 12 for receiving a charge of coffee. The ground coffee fills canister 12 which is provided with suitable feed means to deliver a predetermined quantity of fresh ground coffee into hopper 11 at a point prior to the start of the brew extracting operation.

In this apparatus, brewing cavity 10, at the start of a brewing cycle initiated by a coin operated switch for example, moves horizontally toward the brewing position from the rest position to a place beneath the bottom opening of cylinder 2. During this horizontal movement, the ground coffee is supplied into the brewing cavity 10 through coffee hopper 11 at a supply position (this position being indicated by dotted lines in FIG. 1). When brewing cavity 10 is properly aligned beneath the cylinder 2, due to the operation of cam member 5, cylinder 2 moves downwardly into tight engagement with cavity 10. This forms a chamber which is filled with hot water supplied through duct 7.

Thereafter, piston 4 moves downwardly to force the water through the filter member 3 into the ground coffee in cavity 10 and through an outlet conduct 13 to a cup 14 placed at a dispensing station. Before introducing coffee into the cup, the extracted coffee would be mixed with a suitable amount of sugar and/or cream, both of which are supplied from canisters 15 and 16, respectively. Thereafter, the brewing cavity 10 containing the spent coffee grounds is moved to its rest position and the grounds in the brewing cavity 10 are discarded at a position which is disposed just before the rest position is reached. When the brewing cavity 10 is returned to its rest position, one brewing cycle has been completed.

During the brewing cycle, particularly during the extracting operation, the sealing between the inner surface of cylinder 2 and outer peripheral surface of piston 4 should be very good to effect the most favorable extracting operation. Therefore, since piston 4 is slidably disposed within the cylinder and is provided with a sealing member, the piston 4 should be moved straight downwardly. However, movement of piston 4 is controlled by the operation of cam member 5 so a horizontal force component acts against piston 4 by the operation of cam member 5. Thus, it is possible that the axial center of piston 4 becomes offset from the center of cylinder 2 and as a result of this offset, sealing conditions between piston 4 and cylinder 2 become impaired.

SUMMARY OF THE INVENTION

It is a primary object of this invention to provide an improved beverage brewing apparatus which provides favorable extracting operations while still having a simple construction.

It is another object of this invention to provide a beverage brewing apparatus which is provided with preventive means for limiting offset of the axial center line of the piston from the center of the brewing liquid cylinder to secure improved sealing between these members.

It is still another object of this invention to provide a beverage brewing apparatus capable of easily replacing existing apparatus by simple modification of the existing apparatus.

Beverage brewing apparatus according to this invention includes a frame and a vertically movable brewing liquid cylinder which is supported by the frame, this cylinder having an open top and an open bottom. A piston member is reciprocally disposed within the cylinder. Brewing liquid supply means which has a discharge opening positioned to discharge brewing liquid into the open top of the cylinder is connected to a liquid heating tank in which a brewing liquid is stored. A brewing cavity is disposed beneath the cylinder to be horizontally reciprocable between a brewing position and a rest position. This cavity is tightly engaged with the open bottom of the cylinder to form the brewing chamber when placed in the brewing position. The ground beverage material is supplied into the brewing cavity through ground material supply means. A cam member which is rotated by a motor controls the relative movement of the cylinder and piston, and also determines the timing of the supply of liquid and beverage material. The piston member has a mechanism for preventing offset of the axial center line of the piston member from the center line of the cylinder while downward movement of the piston and cylinder occurs.

Further objects, features and other aspects of this invention will be understood from the detailed description of the preferred embodiments of this invention while referring to the annexed drawings.

DETAILED DESCRIPTION OF THE PREFERRED EMBODIMENTS

Figure 1:
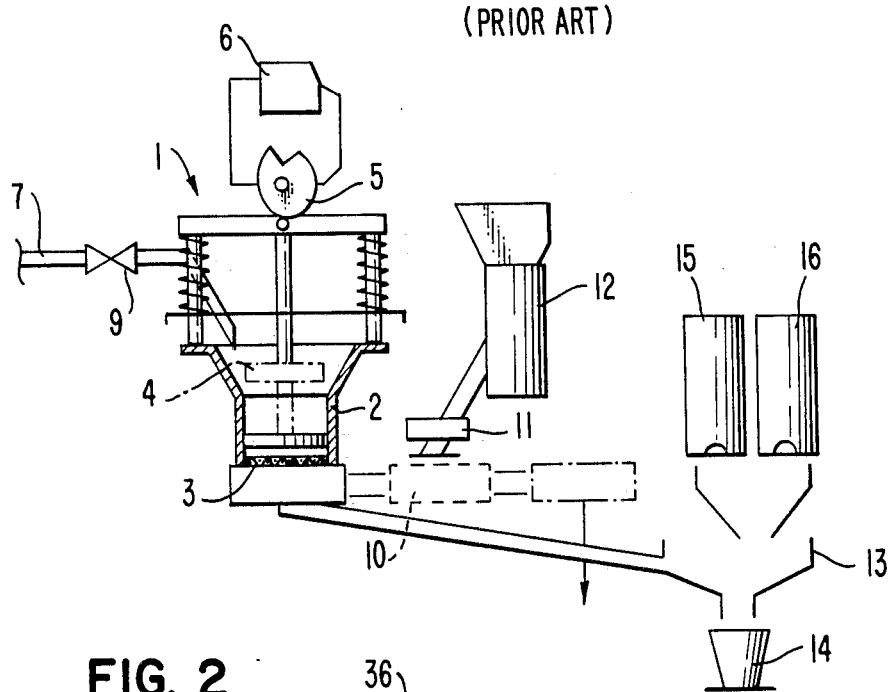
FIG. 1 is a diagramatic view of a prior art brewing apparatus to illustrate the basic construction and brewing cycle.
Figure 2:
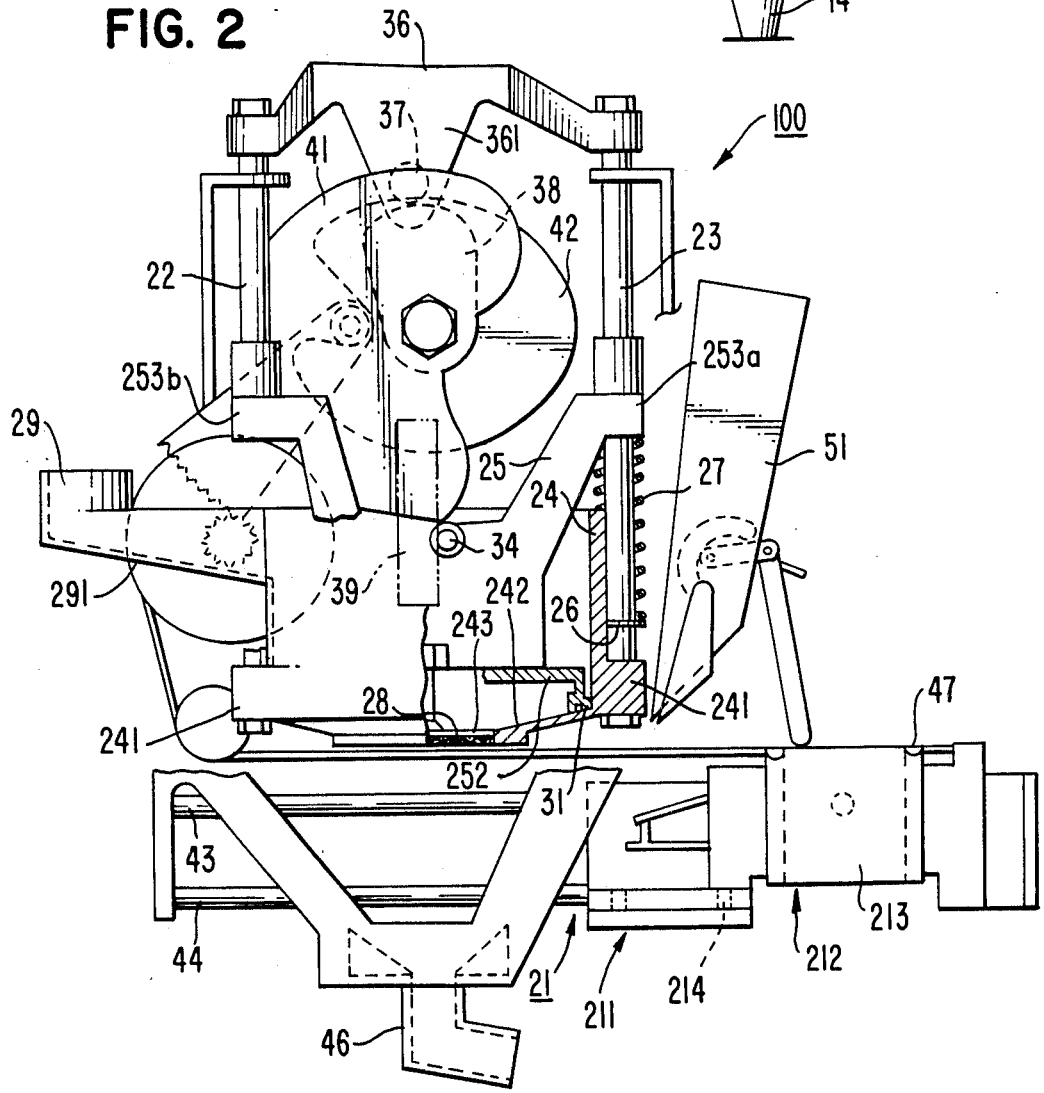
FIG. 2 is a partial sectional front view of a beverage brewing apparatus according to one embodiment of this invention.
Figure 3:
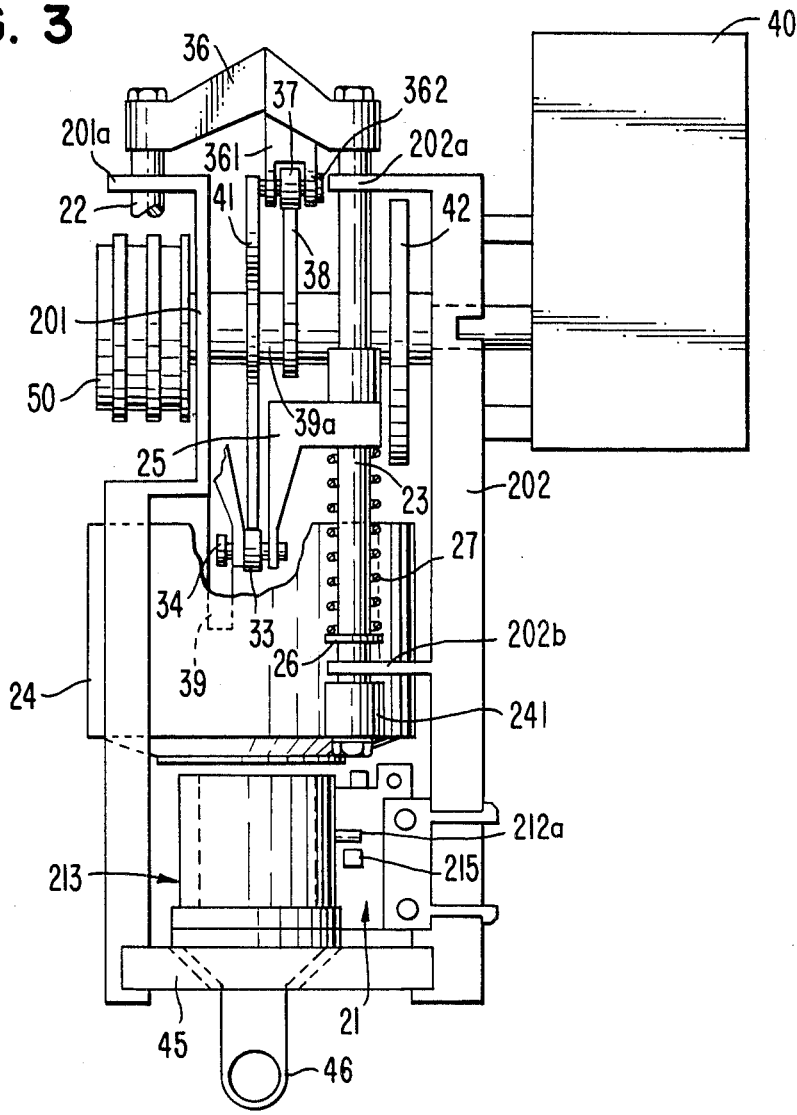
FIG. 3 is a partly cutaway side view of the beverage brewing apparatus of FIG. 2.
Figure 4:
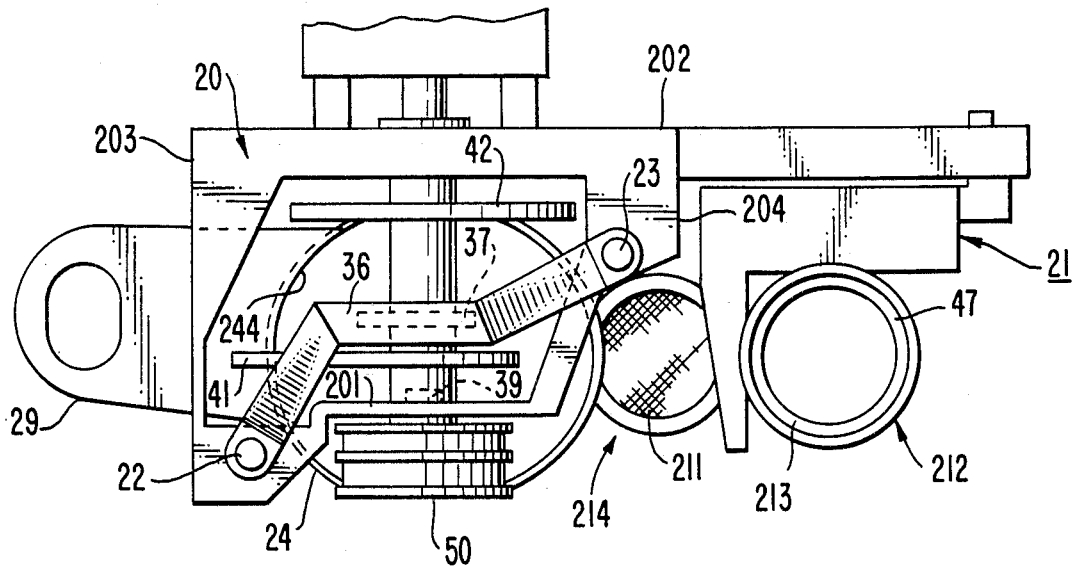
FIG. 4 is a plan view of the beverage brewing apparatus of FIG. 2.

Referring to FIGS. 2-4, a beverage brewing apparatus 100 in accordance with the present invention is shown. The brewing apparatus 100 includes a frame body 20 defined by a front wall 201, rear wall 202 and side walls 203 and 204 (FIG. 4). Rear wall 202 provides a base portion 21 including a filter supporting carriage 211 and brewing cavity carriage 212 to be described hereinafter. The side walls 203 and 204 are used to maintain the proper spaced relation between front and back walls 201 and 202.

A front guide rod 22 is mounted on front wall 201 and a rear guide rod 23 is supported on rear wall 202. Guide rods 22 and 23 are generally diagonally opposite one another within the frame body 20 and support a brewing cylinder 24 and piston 25 to be described hereinafter.

Brewing cylinder 24 has a pair of supporting portions 241 projecting from an outer peripheral surface thereof. Each of the rods 22 and 23 extends vertically and is fixed to one of the supporting portions 241. Rod 23 is supported by bearing support 202a on rear wall 202 while rod 22 is supported by a corresponding bearing support 201a on front wall 201. A snap ring 26 is fitted on each of guide rods 22 and 23, located above supporting portions 241 and a spring 27 surrounds each of rods 22 and 23 at a location above snap ring 26. Thus, cylinder 24 is fixed to and movable with rods 22 and 23.

As clearly shown in FIG. 2, cylinder 24 has a top opening and lower opening 243 with brewing cylinder 24 also having a sloped bottom 242 which extends to the reduced diameter lower opening 243 and is coaxial therewith. The lower opening 243 is covered by a fine mesh screen 28 which is removably disposed within opening 243. This screen 28 prevents coffee grounds or other extract material from entering into cylinder 24 together with the hot water while the brewing operation is in progress.

Cylinder 24 is provided with a series of inlet ports 244 at its upper inner periphery (FIG. 5) and a chute 29 extends from the outer peripheral surface of cylinder 24 communicating with the interior inlet ports 244. Chute 29 has a sloping bottom wall 291 which communicates with inlet ports 244 so that hot water way be introduced through chute 29 at a location below piston 25 when piston 25 is in its upper most position.

Figure 5:
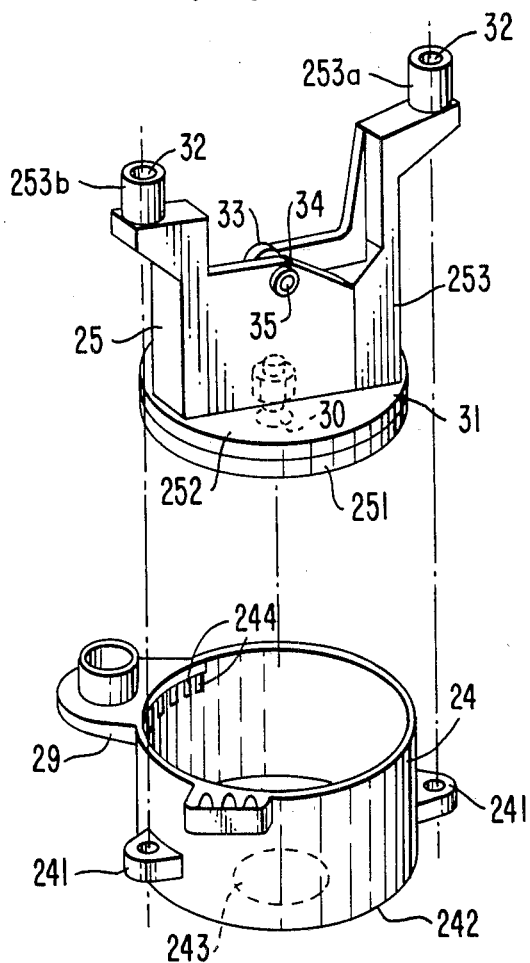
FIG. 5 is a diagramatic exploded perspective view of the cylinder and piston used in FIG. 2.

Piston 25 remains at all times within cylinder 24 and comprises lower and upper portions 251 and 252. Portions 251 and 252 are connected with one another by a bolt-nut arrangement 30 as shown in FIG. 5. A seal element 31 is placed on the outer peripheral surface of upper portion 252 to effect sealing between cylinder 24 and piston 25. Upper portion 252 of piston 25 has its upper end surface integrally connected to a U-shaped bridge 253. Each of the ends 253a and 253b of bridge 253 is formed with a bore hole 32 through which one of the rods 22 or 23 extends. The upper ends of the springs 27 which are disposed to surround rods 22 and 23, respectively, are contacted with the undersides of the ends 253a and 253b of bridge 253. Springs 27 thereby apply a force between snap rings 26 and ends 253a and 253b of bridge 253, thereby biasing piston 25 upwardly.

A cam follower 33 and a centering roller 34 are rotatably supported on bridge 253 through a shaft 35 disposed to extend through the center portion of bridge 253. The ends 253a and 253b of bridge 253 constitute a pair of bearing guides working as a three point suspension in conjunction with seal element 31 on piston 25.

A guide element 39 is mounted on an inner surface of front wall 201 facing centering roller 34 to accommodate rolling motion of roller 34 along guide element 39. Therefore, straight downward movement of piston member 25 is maintained by the rolling motion of centering roller 34 along one side surface of guide element 39.

A cylinder operating bridge 36 has its ends secured to the upper ends of rods 22 and 23, respectively. The arrangement is such that with cylinder 24 being fixed on the lower ends of rods 22 and 23, and cylinder operating bridge 36 being fixed on the upper ends of rods 22 and 23 there is provided a positive fixed mounting system for insuring parallelism of rods 22 and 23, and for insuring smooth upward and downward movements of vertical arm 361 extending downwardly from bridge 36. Arm 361 of bridge 36 is provided with a slot in its lower end which rotatably supports a cam follower 37 on a support shaft 362 on arm 361, cam follower 37 cooperating with a cam 38.

A cam shaft 39a extends between front and rear walls 201 and 202. Rear wall 202 has a hold (not shown) through which one end of cam shaft 39a extends. This end of cam shaft 39a is connected with a motor device 40. Three cams including a first cam 41 acting as the piston cam cooperating with piston cam follower 33, a second cam 38 cooperating with bridge cam follower 37 and a third cam 42, are secured to cam shaft 39a spaced therealong as shown on FIG. 3.

Base portion 21 includes upper and lower rods 43 and 44 as shown on FIG. 3. Brewing cavity carriage 212 which supports brewing cavity 213 is slidably supported on rods 43 and 44. Filter support carriage 211 in which filter 214 is removably disposed is also slidably supported on rods 43, 44. Brewing cavity 213 has a groove formed in its upper surface to retain a seal element 47 that assures sealing between the lowermost surface of cylinder 24 and brewing cavity 213.

A funnel support 45 is disposed between the front and rear walls 201 and 202. A funnel 46 extends through and is supported by the funnel support 45. The top of funnel 46 has an outwardly extending rectangular flange. The bottom of funnel 46 merges into a tubular section formed with an elbow to change direction whereby liquid flowing therethrough may be finally directed to a cup for receiving the extracted beverage.

In the above described beverage brewing apparatus, upon initiation of an electrical input which may in response to introducing a coin into a dispensing mechanism, motor 40 turns camshaft 39a clockwise.

By reason of the rotation of camshaft 39a, brewing cavity carriage 212 moves horizontally toward the left side in FIG. 2 through the operation of third cam 42.

Figure 6:
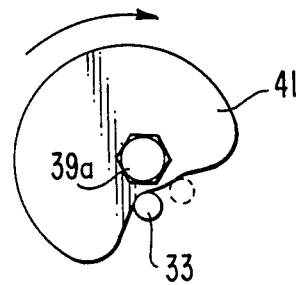
FIG. 6 is a diagramatic view illustrating the operation of one cam element.

When brewing cavity 213 is disposed above filter support carriage 214, a predetermined amount of ground coffee is supplied into brewing cavity 213 through coffee hopper 51. After brewing cavity 213 receives the ground coffee, brewing cavity 213 continues to move toward the left side together with filter support carriage 214. When brewing cavity 213 is properly aligned beneath cylinder 24, movement of cavity 213 and support carriage 212 is stopped and, cylinder 24 moves downwardly into tight engagement with cavity 213. The tight sealing betweeCn cylinder 24 and brewing cavity 213 is secured by seal element 47 disposed on the upper surface of brewing cavity 213. As camshaft 39a continues to rotate, a predetermined amount of hot water is supplied into cylinder 24 through chute 29. The timing for supply of the ground coffee into brewing cavity 213 and hot water into cylinder 24 is controlled by the rotation of pulley 50 fixed on the front end of cam shaft 39a extending from front wall 201. Camshaft 39a continues rotating clockwise with piston follower 33 riding in a dwell section on pistom cam 41 as shown in FIG. 6.

As piston cam 41 rotates, piston 25 moves downwardly and, during this downward movement of piston 25, the ends 253a and 253b of U-shaped bridge 253 compress springs 27 surrounding guide rods 22 and 23 to ensure sealing of seal element 47 disposed on brewing cavity 213 with a seal element (not shown) placed between the lowermost opening of brewing cavity 213 and filter 214. During the brewing operation, springs 27 are continuously compressed by the downward movement of U-shaped bridge 253 to insure sealing between cylinder 24 and brewing cavity 213, and between cavity 213 and filter 214. After piston 25 has passed water inlet ports 244 on the upper inner wall surface of cylinder 24, a layer of sealed air is trapped between the top of the hot water surface and bottom face of piston 25.

During the downward movement of piston 25, centering cam 34 rolls along one side surface of guide element 39. Therefore, lateral horizontal movements of piston 24 which might be caused by movements of piston cam 41 are prevented by contact between centering cam 34 and guide element 39.

When piston 25 reaches a lowered piston whereat all of the hot water has been forced through the ground coffee in brewing cavity 213, piston 25 continues downwardly at a slightly increased speed to enforce hot air through the spent ground coffee. Just prior to the end of its downward stroke, piston 25 approaches zero downward acceleration. The hot air passed through the spent ground coffee dries out the grounds, thereby rendering them in a dry enough state so that they may be easily discharged. The extracted beverage is supplied to a cup (not shown) through funnel 46.

When piston 25 reaches the end of its downward stroke, cylinder 24 and piston 25 are moved slightly upwardly to clear the top flange on brewing cavity 213. Therefore, brewing cavity 213 is free to be easily released from the brewing position and moved toward the right side in FIG. 2.

When the filter support carriage 211 reaches a predetermined position, movement of the filter support carriage 211 is stopped, but brewing cavity carriage 212 continues its right side movement.

Figure 7:
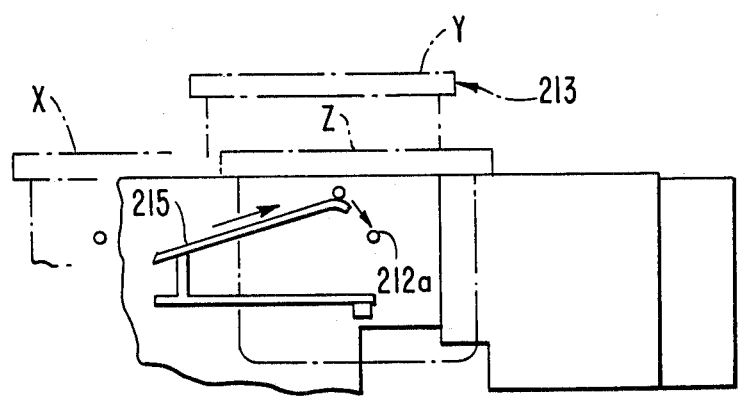
FIG. 7 is a partially enlarged view of the beverage brewing apparatus illustrating the operation of dumping the spent coffee grounds.

As shown in FIG. 7, after brewing cavity carriage 212 is separated from filter support carriage 211, pin 212a projecting from brewing cavity 213 makes contact with a spring like pawl 215 mounted on base portion 21. This contact between pin 212a and pawl 215 causes cavity 213 to be elevated due to the continued horizontal movement of brewing cavity 213. Thus, brewing cavity 213 moves upwardly from position X to position Y due to the continuing horizontal movement of brewing cavity 213, and when brewing cavity 213 reaches its extreme top position Y, pin 212a rides off the end of pawl 215 dropping the cavity 213 into position Z. This downward motion and abrupt stop of brewing cavity 213 at position Z causes the dried out spent ground coffee to break completely and freely from cavity 213. After the spent ground coffee is discarded from brewing cavity 213, one brewing cycle has been completed.

Figure 8:
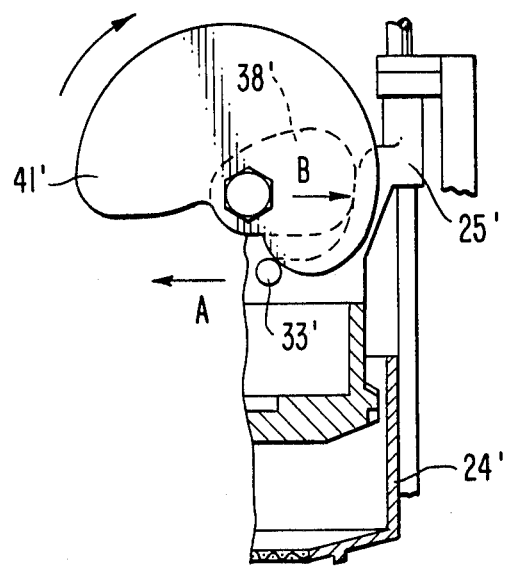
FIG. 8 is a diagramatic view of cam elements according to another embodiment of this invention.

Referring to FIG. 8, another embodiment of this invention is shown. During the downward movement of piston 25', an outer peripheral surface of bridge cam 38' contacts with a surface of the U-shaped bridge of piston 25' to apply a pushing force B which is opposite in direction to the horizontally applied force A caused by the operational effects of piston cam 41'. Thus, lateral horizontal movement of piston 25' due to operation of piston cam 41' is prevented by contact between bridge cam 38' and piston 25', insuring straight downward movement of the piston.

As mentioned above, the piston member and/or piston moving device is provided with a mechanism to prevent lateral horizontal movement to thereby insure alignment of the axial center lines of the piston and the cylinder being maintained. Therefore, sealing between the cylinder and piston may be positively held to accomplish the desired quality of the beverage extracting operation.

This invention has been described in detail in connection with the preferred embodiments, but the preferred embodiments are examples only and this invention is not to be considered as restricted thereto. It will be easily understood by those skilled in the art that other variations and modifications can be easily made within the scope of this invention as claimed.

We claim:

1. In a beverage brewing apparatus comprising: a frame; a vertically movable cylinder member supported on said frame, said cylinder member having an open top and an open bottom; a vertically movable piston member disposed in said cylinder and supported by said frame; means for supplying hot water into said cylinder below the elevation of said piston; a base assembly including a brewing cavity disposed beneath said cylinder member, said brewing cavity being mounted to be movable horizontally between a brewing position and a discharge position and be sealed with said cylinder member in said brewing position; a motor driven camshaft; a plurality of cams on said camshaft; a first cam follower on said piston member; a second cam follower on said cylinder member; each of said cam followers being in contact with one of said cams whereby movement of said piston member and said cylinder member is determined by operation of said cams through said cam followers; the improvement comprising mechanism provided on said piston member for preventing said piston member from undergoing lateral horizontal movement while said piston member moves downward to hold the center lines of said piston member and said cylinder member in alignment, said mechanism comprising a centering roller rotatably supported on said piston member together with said first cam follower and a guide element disposed on said frame facing said centering roller to guide rolling movement of said roller along a surface of said guide element.

2. In a beverage brewing apparatus comprising: a frame; a vertically movable cylinder member supported on said frame, said cylinder member having an open top and an open bottom; a vertically movable piston member disposed in said cylinder and supported by said frame; means for supplying hot water into said cylinder below the elevation of said piston; a base assembly including a brewing cavity disposed beneath said cylinder member, said brewing cavity being mounted to be movable horizontally between a brewing position and a discharge position and be sealed with said cylinder member in said brewing position; a motor driven camshaft; a plurality of cams on said camshaft; a first cam follower on said piston member; a second cam follower on said cylinder member; each of said cam followers being in contact with one of said cams whereby movement of said piston member and said cylinder member is determined by operation of said cams through said cam followers; the improvement comprising mechanism provided on said piston member for preventing said piston member from undergoing lateral horizontal movement while said piston member moves downward to hold the center lines of said piston member and said cylinder member in alignment, said piston member comprising a cylinder portion which is slidably disposed within said cylinder member and U-shaped bridge portion which is fixedly mounted on said cylinder portion, said bridge portion being operatively connected with said frame and, said mechanism comprising said one of said cams which cooperates with said second follower also engaging with said U-shaped bridge portion on said piston whereby an outer peripheral portion of said one of said cams contacts against an inner surface of said U-shaped bridge portion to take up the thrust force acting against said piston member through the operational effects of the other cams.

* * * * *